United States Patent [19]
Garnett

[11] 3,867,969
[45] Feb. 25, 1975

[54] CONTROL OF DUST DURING HANDLING OF MATERIALS

[75] Inventor: George William Garnett, Stockton-on-Tees, England

[73] Assignee: Imperial Chemical Industries Limited, London, England

[22] Filed: Sept. 10, 1973

[21] Appl. No.: 395,597

[30] Foreign Application Priority Data
Sept. 19, 1972  Great Britain ............... 43285/72

[52] U.S. Cl. ............... 141/59, 141/93, 141/286, 141/392
[51] Int. Cl. ............................................. B65b 1/28
[58] Field of Search ......... 141/392, 59, 67, 68, 286, 141/93

[56] References Cited
UNITED STATES PATENTS
3,118,474  1/1964  Eppolito ............................... 141/68

FOREIGN PATENTS OR APPLICATIONS
278,497  10/1927  Great Britain ............... 141/392

Primary Examiner—Houston S. Bell, Jr.
Attorney, Agent, or Firm—Cushman, Darby & Cushman

[57] ABSTRACT

Apparatus for controlling dust produced during gravity chute-loading of dusty solids into ships comprises a base plate having a central aperture engaging the chute, a flexible skirt extending downwardly from the plate to enclose loaded solids, variable-length bellows surrounding the chute and connected at the bottom to the plate and at the top to an air de-duster, and openings in the plate providing access for dust-laden air from the loaded solids into the bellows.

8 Claims, 3 Drawing Figures

PATENTED FEB 25 1975

CONTROL OF DUST DURING HANDLING OF MATERIALS

The present invention relates to the bulk-handling of particulate (including crushed, granular or powdered) "dusty" materials which, when discharged by gravity into open-topped containers (for example during the loading of ships' holds, railway wagons or the like) cause clouds of dust which are dirty, obnoxious, and possibly harmful to people living or working in the vicinity and to neighbouring organisations and installations. This particular nuisance has recently attracted much public attention, but so far, despite the efforts to eliminate or minimise it, no satisfactory solution of the problem has been found.

The invention is particularly, but not exclusively applicable to ship-loading devices (which may be mobile or fixed) adapted to load bulk solid materials into ships' holds by means of fixed or telescopic chutes. In considering the problem to be solved, we took, as a typical example, a ship-loader with a variable-length conveyor upon which material was carried upto and into a telescopic chute within which it fell by gravity into the ship's hold. The ship-loader was designed to give considerable scope in locating the telescopic chute in ships of various sizes. In the particular case studied, the maximum chute extension required to bring it close to the bottom of the ship's hold was 70 ft, and loading rates of 1,000 tons/hour were contemplated.

It was realised that even if the dust content of the material was very small, the intimate mixing of air and the material within the chute, accompanied by the pumping action of the material falling 70 ft vertically down the chute would give rise to a considerable dust cloud. Practice has shown that a ship's hold would normally quickly be filled by the dust cloud, and since loading would continue for several hours, dust-laden air would be blown out of the hold and carried by the wind to create a nuisance not only in the immediate vicinity but possibly over a considerable area.

The present invention accordingly provides an apparatus for controlling dust clouds caused by the loading into containers of bulk solid material falling by gravity through a chute, comprising a base plate, an aperture substantially centrally located in the base plate and adapted to engage the lower end of the chute, a flared skirt depending from the base plate and adapted to cover the heap of material formed as the material falls from the chute, a tubular cover secured by its lower end to the base plate which completely surrounds the aperture and encloses the chute with an annular space therebetween, a plurality of openings in the base plate, between the aperture and the tubular cover providing access for air and dust from below the base plate into the annular space. Preferably the apparatus includes means for removing air and dust from the top of the annular space.

One embodiment of the invention is hereinafter described with reference to the accompanying drawings, wherein.

Figure 1:
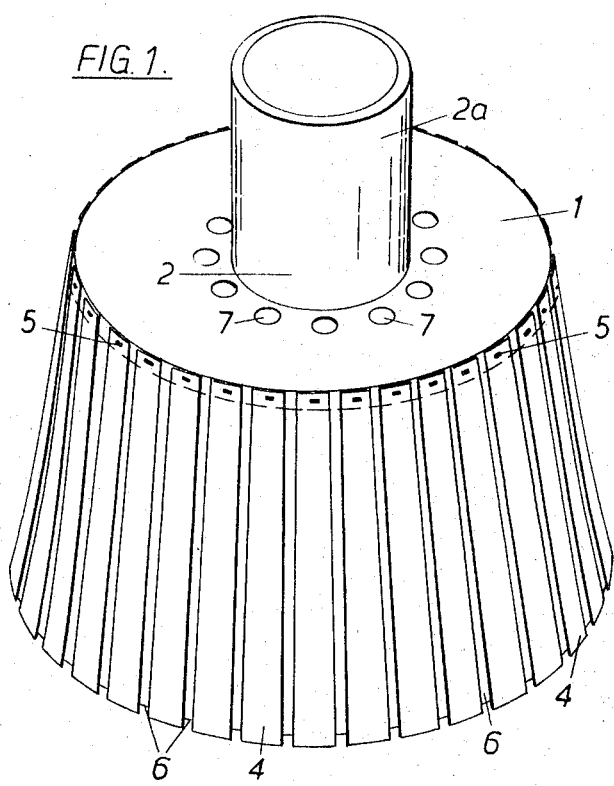
FIG. 1 is a perspective view of the base of the apparatus.
Figure 2:
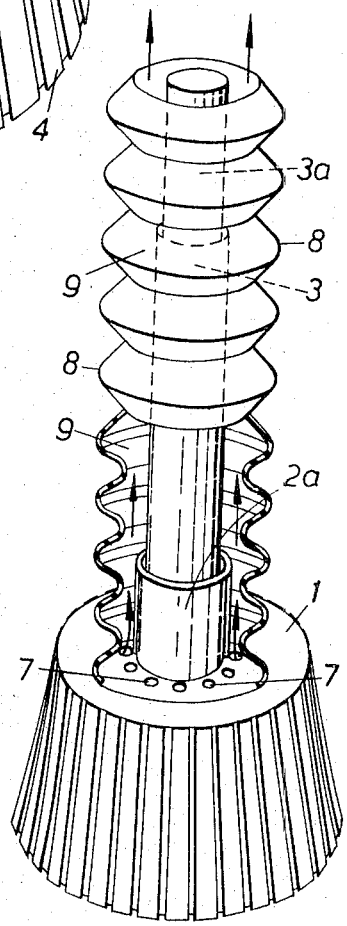
FIG. 2 is a perspective view showing the base of the apparatus engaging the material chute which is enclosed by the tubular cover.

Referring to FIGS. 1 and 2, a metal base plate 1, with a downwardly extending rim (shown in dotted lines) has a central aperture 2 which is, more conveniently, an upstanding hollow pipe 2a adapted to engage the lower end of a telescopic chute 3, 3a (FIG. 2) through which the material being loaded falls to below the base plate 1.

The edge of the base plate 1 is provided with a flared skirt consisting of an outer row of downwardly extending individual strips 4 of a flexible material (e.g. rubber) each secured at its top end to the rim of the base plate 1 by studs 5 or the like, and a similar inner row of similar strips 6 which are laterally staggered with respect to, and at least partially covered by, the strips 4. Preferably there is at least one further row of similar strips (not shown) behind the strips 6 and laterally staggered with respect thereto. It will thus be appreciated that as the heap of material beneath the base plate 1 increases in size, the flexible flared skirt is able to bend outwardly, covering a greater area and preventing the escape of clouds of dust. The dust cloud formed as fresh material hits the top of the pile is thus contained within the skirt.

In an alternative embodiment (not illustrated) there may be only one row of strips, similar to the strips 4, each laterally overlapping an adjacent strip, but the illustrated embodiment is preferred.

Surrounding the central aperture 2 (or pipe 2a), the base plate 1 is provided with a plurality of openings 7 through which the dust entrapped by the flared skirt can escape. However, a tubular cover in the form of a variable length bellows 8, the foot of which is secured to the base plate 1, surrounds the holes 7 and encloses the whole of the chute 3, 3a forming therewith an annular duct 9 through which dust and air from the openings 7 can escape upwardly. (The height of the bellows 8 can be varied at will, by extending or compressing the bellows, depending upon the height of the chute 3, 3a).

(Although not illustrated, at the top of the bellows 8, the dusty air from the openings 7 is transferred to a variable-length duct attached to a ship-loader boom which is variable in length and angle. This is to allow the ship-loader to extend unhindered to various distances from the wharf-side).

Figure 3:
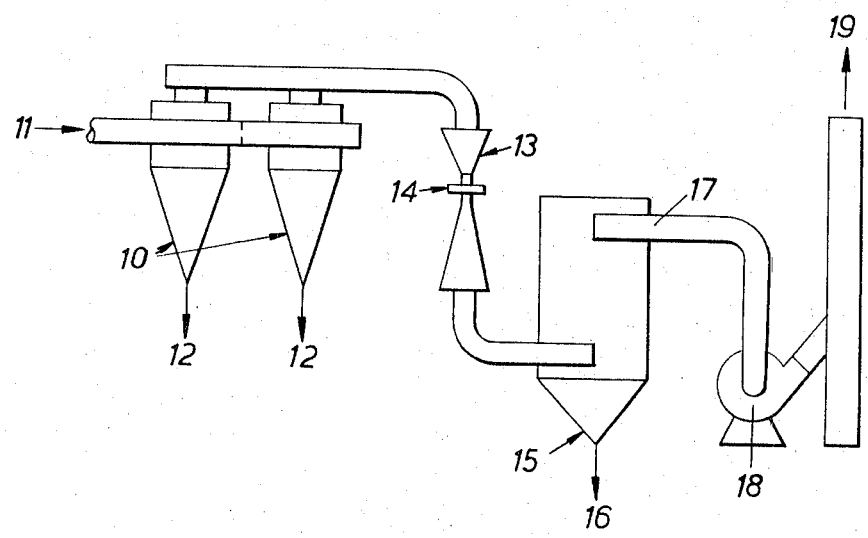
FIG. 3 illustrates, diagramatically, a de-dusting system for removing and disposing of dust collected by the apparatus.

The dusty air from the bellows 8 is fed to a de-dusting system such as illustrated in FIG. 3 consisting of a self-explanatory combination of gas cyclones 10 (into which dust-laden air is led at 11, and from which dry dust is recovered at 12), and a wet washer comprising a venturi scrubber 13 with a water inlet 14 and a mist eliminator 15. A slurry of dust and water is removed at 16, while cleaned air is removed at 17 by means of a fan 18 and vented to the atmosphere at 19. It will be understood that the system illustrated in FIG. 3 is only one example of many de-dusting systems which may be used.

It will be appreciated that since the skirt is flexible and able to bend or flare outwardly, the amount of dust which can escape therethrough is minimised. Furthermore, while bulk material is falling through the chute, dust and air can only escape upwardly (through the openings 7 and the annular duct 9) to the de-dusting system and not to the atmosphere. In fact, by preselecting the size and number of the openings 7 and the diameter of the duct 9, the upward velocity of the dust-laden air in the duct 9 can be reduced to the point where the amount of dust to be removed by the de-dusting system is minimised.

I claim:

1. Apparatus for controlling dust clouds caused by the loading into containers of bulk solid material falling by gravity through a chute, comprising a base plate, an aperture substantially centrally located in the base plate and adapted to engage the lower end of the chute, a flared skirt depending from the base plate and adapted to cover the heap of material formed as the material falls from the chute, a tubular cover secured by its lower end to the base plate and which completely surrounds the aperture and encloses the chute with an annular space between the chute and the tubular cover, and a plurality of openings in the base plate, between the aperture and the tubular cover, providing access for air and dust from below the base plate into the annular space.

2. Apparatus as claimed in claim 1, wherein said aperture comprises an upstanding hollow pipe adapted to engage the lower end of the chute.

3. Apparatus as claimed in claim 1, wherein the tubular cover comprises a variable-length bellows adapted to be extended or compressed depending upon the length of the chute.

4. Apparatus as claimed in claim 1, wherein said flared skirt comprises an outer row of downwardly-extending individual strips of a flexible material, each secured at its top end to the edge of the base plate, and a similar inner row of similar strips laterally staggered with respect to, and at least partially covered by, the strips of the outer row.

5. Apparatus as claimed in claim 4, including at least one further similar row of similar strips, behind the inner row, laterally staggered with respect to the strips of the inner row.

6. Apparatus as claimed in claim 1, wherein said flared skirt comprises a plurality of downwardly extending strips of a flexible material, each secured at its top end to the edge of the base plate and each laterally overlapping an adjacent strip.

7. Apparatus as claimed in claim 1, including means for removing air and dust from the top of the annular space.

8. Apparatus as claimed in claim 1, including means for connecting the top of the annular space to a de-dusting system.

* * * * *